United States Patent [19]
Kuramoto et al.

[11] 3,763,755
[45] Oct. 9, 1973

[54] MOTOR-DRIVEN SYSTEM FOR A STILL CAMERA

[75] Inventors: Yoshio Kuramoto, Toyonaka City; Kayoshi Tsujimoto, Osaka City; Toshio Kobori, Sakai City, all of Japan

[73] Assignee: Minolta Camera Kabushiki Kaisha, Minami-ku, Osaka Prefecture, Japan

[22] Filed: Oct. 28, 1971

[21] Appl. No.: 193,405

[30] Foreign Application Priority Data
Oct. 30, 1970 Japan................ 45/96085

[52] U.S. Cl.......... 95/31 EL, 95/31 AC, 95/53 EA, 95/53 E
[51] Int. Cl...... G03b 19/00, G03b 9/58, G03b 1/12
[58] Field of Search ............... 95/31 EL, 53 EA, 95/53 E, 31 AC

[56] References Cited
UNITED STATES PATENTS
3,594,747  7/1971  Cronin................ 95/31 EL
3,434,405  3/1969  Friedman............ 95/31 EL Primary Examiner—Robert P. Greiner
Attorney—Craig, Antonelli & Hill

[57] ABSTRACT

In a motor-driven system for a still camera provided with a motor for advancing a film and cocking the shutter, with an electromagnet for controlling the shutter and with a network for controlling said motor and said electromagnet, an electronic circuit portion of the network is fed by one battery having a substantially constant-voltage but of small capacity, such as a mercury battery, and the electromagnet and the motor are fed by another battery of larger less expensive capacity, but having a voltage characteristic less constant than the one battery, such as manganese battery, so that the delicate electronic circuit portion has a substantially lengthy operating period.

9 Claims, 3 Drawing Figures

MOTOR-DRIVEN SYSTEM FOR A STILL CAMERA

BACKGROUND OF THE INVENTION

This invention relates to an improvement in a motor-driven system for a still camera, wherein a switching circuit and the electromagnet connected thereto is controlled by the operation of a switch button, the electromagnet controls the motion of the shutter, and the circuit controls the motion of a motor for advancing film and cocking the shutter.

In a modern motor-driven system for a still camera or a motor-driven still camera, an electronic exposure control is employed not only for automatic exposure-controlled photography but also for photography by manual selection of the exposure. In such an electronic exposure control, the exposure time depends on the length of time of energization of the electromagnet, which holds the previously opened shutter in an open state while energized. Accordingly, when the battery feeding the electromagnet loses its voltage by repeated photographing, the electromagnet fails to carry out its proper function. Since a battery of constant voltage and constant current is used in conventional motor-driven camera, the battery being generally of small capacity, when consecutive photographing is carried out under low temperature conditions, the battery output decreases in a relatively short period of time and causes insufficient operation of the shutter.

SUMMARY OF THE INVENTION

An object of this invention is to provide an improved motor-driven system for a still camera, wherein a delicate electronic circuit portion of the system is fed from one battery having a small capacity but a substantially constant and current voltage characteristic, while an electromagnet and a driving motor are fed from another battery of larger capacity but having a less constant output voltage and output current characteristic.

The motor driven still camera of the present invention attains accurate exposures for a period longer than conventional one, owing to the provision of respective batteries for the electronic circuit portion and for the electromagnet and the motor.

DETAILED DESCRIPTION OF THE INVENTION

Figure 1:
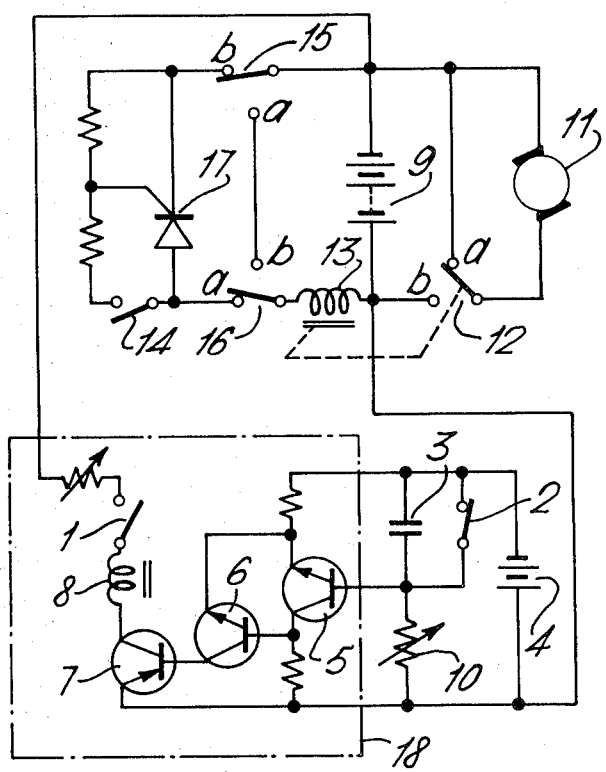
FIG. 1 is a circuit diagram of a motor-driven system for a still camera embodying the present invention.

In FIG. 1, a main switch 1 is constituted so as to be closed at the beginning of the pressing of a release switch button of the camera and to be kept closed until closing of a shutter which has been opened by said pressing of said release switch button. Another switch 2 is so constituted as to be opened when the shutter is opened and to be closed when a shutter cocking means, which is interlocked with a film advancing means, cocks the shutter simultaneously with completion of the film advance. A battery 4 is for operating the electronic circuit and, accordingly, is a battery having a constant voltage-constant current characteristic, though its capacity is not so large. A capacitor 3 and a variable resistor 10 constitute a timer circuit, and transistors 5 and 6 constitute a modified Schmitt circuit for driving a transistor 7. The transistors 5 and 6 are fed by the battery 4, while the output transistor 7 is fed by another battery 9 of larger capacity and disposed so as to be easily replaceable.

At first, the voltage across both terminals of the capacitor 3 is very low and, therefore, the transistor 5 is non-conductive while the transistors 6 and 7 are conductive, thereby energizing an electromagnet 8 which is connected in series with said transistor 7 and the switch 1. The electromagnet 8 is for holding the previously opened shutter in an open state while energized.

When the voltage of the capacitor 3 becomes high as a consequence of charge-up to reach the trigger-level of the Schmitt circuit, the transistors reverse their states, making the transistor 5 conductive and the transistor 6 non-conductive, thereby imparting a delayed signal to the transistor 7. Accordingly, the transistor 7 becomes non-conductive, de-energizing the electromagnet 8 and hence, closing the shutter.

Exposure time, namely the open period of the shutter, is determined by a time constant defined by the capacitance of the capacitor 3 and the resistance of the variable resistor 10. For variable resistor 10, a photoconductive element such as a cadmium sulfide element can be used in order to attain an automatic exposure control function. In order to attain a precise exposure time, the voltage of the battery 4 should be as constant as possible.

Snce the electromagnet 8, which consumes a large current, is not fed by the battery 4, the battery 4 feeds its current only to the timer circuit (3, 10) and to the switching circuit comprising the transistors 5 and 6. Since the circuit fed by the battery 4 consumes very little current, the battery 4 may be expensive but should have a constant voltage characteristic and, therefore, may be a mercury cell. On the other hand, since the electromagnet 8 is fed by the motor-driving battery 9, which has a large capacity, is installed in an easily replaceable manner and is relatively inexpensive, but does not necessarily have a constant voltage characteristic, satisfactory operation of the mechanism can be ensured by changing the battery 9 after an appropriate period of time.

The motor 11 is connected to the battery 9 through a normally open contact b of a relay 13. A normally closed contact a of the relay 3 is connected thereto, to shortcircuit the motor 11 for braking it when the relay 13 is de-energized. The relay 13 is connected in series with the contact a of a switch 16, to a semiconductor switching device such as a thyristor 17 and to the contact b of a switch 15 across the battery 9. A switch 14 is for triggering the thyristor 17 when it is closed. The switch 14 is constituted to be open when the shutter is open and to be closed when the shutter is closed. The change-over switch 15 is interlocked with a film advancing mechanism in such a manner that the switch 15 is switched to contact a only when advance of one frame of the film is completed and is switched to contact b for the rest of the period. The change-over switch 16 is interlocked with the release switch button so as to be normally closed to contact a but is changed to contact b during the period when the release switch button is pressed.

Accordingly, when the release switch button is pressed, the switch 1 is closed and hence, the shutter is opened, simultaneously opening the switch 2 and also changing the switch 16 to the b contact. Subsequently, after a specified time when the capacitor 3 is charged up, the electromagnet 8 is energized and the shutter is closed, and accordingly, the switch 14 is closed, thereby delivering a triggering voltage to the thyristor 17. By resetting the release switch button, the switch 16 is reset to the contact a and, therefore, the relay 13 is energized by a current flowing through the battery 9, the relay 13, the a contact of the switch 16, the thyristor 17 and through the normally closed b side contact of the switch 15. As a result of such energization of the relay 13, the switch 12 is switched to the b side and thereby causes the motor 11 to rotate for winding up the film and cocking the shutter.

When the film winding-up is completed, the switch 15 is switched to side a and, accordingly, the relay 13 is de-energized, hence switching the switch 12 to contact a for braking the motor.

The switch 15 is on the a contact since the motor stops at completion of the film advance and, accordingly, when the switch 16 is closed to contact b by pressing the switch button for the next photograph, the relay 13 is energized by a current flowing through the battery 9, the relay 13, the b contact of the switch 16 and through the a contact of the switch 15. Therefore, the motor 11 rotates for a short time. But the motor 11 soon stops, since the switch 15 is switched to contact b as a result of the rotation of the motor 11.

Figure 2:
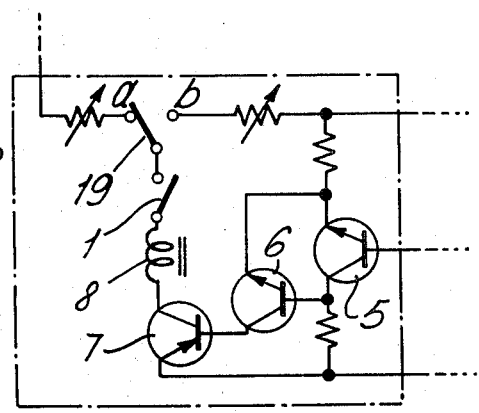
FIG. 2 is a circuit diagram of a modified portion of a circuit of FIG. 1, which portion can be employed in place of portion 18 encircled by a chain line

FIG. 2 indicates a modified circuit diagram which can be used alternatively with the circuit portion 18 encircled by the chain line in FIG. 1.

In a modified example employing the circuit of FIG. 2, the circuit connection is identical to that of FIG. 1, when a manual switch 19 is switched to side a.

Figure 3:
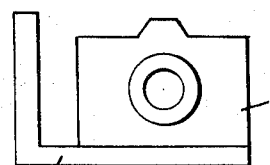
FIG. 3 is a schematic representational view of a still camera with a detachable grip handle arrangement in accordance with the present invention.

However, when the switch 19 is switched to side b, the electromagnet 8 can be fed from the battery 4. Such an alternative feeding is convenient when the system is so constituted that the motor 11, battery 9, relay 13, switches 14, 15 and 16, and the thyristor 17 with its triggering network, are installed in a grip handle 20, as shown in FIG. 3, which is detachable from the still camera 21 itself, when the shaft of the camera, by which the winding up of the film and the cocking of the shutter is linked to the motor 11, and when mechanical shutter releasing member of the camera is linked to the electromagnet 8. Namely, in such a detachable constitution, the camera itself can be used without the grip handle, since the electromagnet can be fed by the battery 4 which is installed in the camera.

As described above, in the motor-driven system for a still camera of the present invention, the delicate electronic circuit portion comprising a timer circuit and a transistor switching circuit is connected to a small but precise battery, while the power-consuming electromagnet and the motor are connected to a larger and easily replaceable battery. As a result of such a construction, conventional shortcomings in that the shutter does not open correctly although the film-advance and shutter-cocking are correctly made, can be avoided.

What we claim is:

1. In a motor-driven system for a still camera which comprises a motor for advancing the film and for cocking the shutter,
a motor-controlling network,
an electromagnet for controlling the closing of the shutter, and
an electronic timer circuit for controlling said electromagnet, said electronic timer circuit having a capacitance-resistance timer circuit and a semiconductor switching circuit responsive to said capacitance-resistance timer circuit for controlling said electromagnet after a delay period determined by said capacitance-resistance timer circuit,
the improvement wherein said motor, said motor-controlling network and said electromagnet are connected to be fed from a large capacity battery, while said electronic circuit is connected to be fed from a battery having a smaller capacity than said large capacity battery and having a constant voltage characteristic.

2. A motor-driven system for a still camera according to claim 1, wherein said large battery is installed in a replaceable manner.

3. A motor-driven system for a still camera according to claim 2, wherein
said motor, said motor-controlling network and said large capacity battery are installed in a grip handle which is detachable from the camera,
while said electromagnet and said electronic timer circuit are installed in the camera,
said electromagnet being connected through a selection switch to the larger battery or to the smaller battery, so that either battery alternatively feed the electromagnet.

4. A motor-driven system for a still camera according to claim 1, wherein said motor-controlling network comprises a relay operated first switch, switchably connected between said motor and said large battery, and second and third switches switchably connecting the relay coil of said relay operated first switch across said large battery in response to a predetermined operation of said camera.

5. A motor-driven system for a still camera according to claim 4, wherein said network further comprises a semiconductor switching device connected across respective contacts of said second and third switches for providing an energizing path from said large battery to said relay coil in response to the closing of the shutter, and means for triggering said semiconductor switching device in response to the closing of the shutter.

6. A motor-driven system for a still camera according to claim 5, wherein said semiconductor switching circuit of said electronic timer circuit comprises a Schmitt trigger circuit and an electromagnet-energizing transistor connected in series, responsive to the output of said resistance-capacitance timer circuit for supplying an energizing signal to said electromagnet, and a fourth switch connected between said electromagnet and said large battery for connecting said electromagnet to said battery in response to the activation of a camera release switch.

7. A motor-driven system for a still camera according to claim 6, further comprising a fifth switch coupled to said electromagnet for selectively connecting said electromagnet to one of said batteries.

8. A motor-driven system for a still camera according to claim 7, wherein said resistance-capacitance circuit comprises a capacitor and a variable resistor connected in series across said smaller battery and further including an additional switch connected in parallel with said capacitor, said additional switch being opened in response to the opening of the shutter to start the charging of said capacitor, the common connection point of the capacitor and resistor in said resistance-capacitance network being connected to the input of said Schmitt trigger circuit.

9. A motor-driven system for a still camera according to claim 1, wherein said capacitance-resistance timer circuit includes a variable resistor and said electromagnet controls the shutter for controlling the exposure time of the film in accordance with output of the electronic timer circuit.

* * * * *